United States Patent [19]
Braendle

[11] Patent Number: 5,642,656
[45] Date of Patent: Jul. 1, 1997

[54] ESPRESSO MACHINE HAVING A SAFETY DEVICE

[75] Inventor: Walter Braendle, Uttwil, Switzerland

[73] Assignee: Eugster/Frismag AG, Romanshorn, Switzerland

[21] Appl. No.: 679,516

[22] Filed: Jul. 12, 1996

[30] Foreign Application Priority Data

Jul. 14, 1995 [DE] Germany .................. 295 11 371.5

[51] Int. Cl.$^6$ .................................................. A47J 31/24
[52] U.S. Cl. .................................................. 99/295; 99/302 R
[58] Field of Search ........................... 99/295, 302 R, 99/300, 279, 307, 316; 426/433

[56] References Cited

U.S. PATENT DOCUMENTS

| | | | |
|---|---|---|---|
| 4,200,039 | 4/1980 | Anderl | 99/302 R |
| 4,429,623 | 2/1984 | Illy | 99/302 R |
| 4,757,753 | 7/1988 | Pandolfi | 99/302 R |
| 5,343,799 | 9/1994 | Fond | 99/295 |

FOREIGN PATENT DOCUMENTS

| | | |
|---|---|---|
| 706126 | 6/1931 | France . |
| 457865 | 3/1928 | Germany . |
| 162960 | 9/1933 | Switzerland . |

*Primary Examiner*—Robert W. Jenkins
*Attorney, Agent, or Firm*—Spencer & Frank

[57] ABSTRACT

An espresso machine having a filter holder which holds a filter strainer and which can, with the assistance of a handel, be detachably locked to the housing of the espresso machine by way of a bayonet coupling or the like. The espresso machine has a discharge section having a water conduit, there being a chamber in the water conduit and a locking member in the chamber. The locking member locks the filter holder on the housing of the espresso machine when there is a predetermined pressure in the chamber and releases the filter holder as soon as the pressure in the chamber has fallen below a predetermined value.

4 Claims, 4 Drawing Sheets

ESPRESSO MACHINE HAVING A SAFETY DEVICE

CROSS-REFERENCE TO RELATED APPLICATION

This application claims the priority of Application No. G 295 11 371.5 filed in Germany on Jul. 14, 1995, the subject matter of which is incorporated herein by reference.

BACKGROUND OF THE INVENTION

The present invention relates to an espresso machine, particularly a steam pressure espresso machine which has a filter holder in which there is a filter strainer and which, with the help of a handle, can be detachably locked to the housing of the espresso machine by way of a bayonet coupling or the like.

In known espresso machines, a filter strainer sits in a filter holder which is provided with a handle and is connected to the espresso machine by way of a bayonet coupling. For placing ground coffee into and removing it from the filter holder, the filter holder is separated from the espresso machine. Under operating conditions, this filter strainer/filter holder unit is under a water pressure of 2–15 bar—depending on the type of machine; this water pressure presses hot water through the ground coffee disposed in the filter strainer. To ensure proper operation, the ground coffee is placed into and removed from the filter strainer so long as the espresso machine is still—or is again—unpressurized. See, for example, DE-C-457,865, FR-A-706,126 or CH-A-162,960.

If, in espresso machines of the above type, the filter holder is separated from the espresso machine under operating pressure, the hot water which would then escape under high pressure may scald the operator or the water pressure may catapult away the filter holder and cause injuries and/or damage to the machine or other property.

In pump espresso machines, which work with operating pressures exceeding 5 bar, it is hardly possible to separate the filter holder from the espresso machine under pressure because the pressing caused by the high pressure between the connecting elements of filter holder and espresso machine is so great that the bayonet catch practically cannot be released. Furthermore, the force-coupled water pump is switched off after the brewing process is completed and, thus, the water pressure is reduced immediately.

In steam pressure espresso machines, on the other hand, which work with pressures of 2–4 bar, safety precautions must be taken to reliably prevent the filter holder from separating from the espresso machine under operating pressure since, in these systems, the steam water pressure is maintained even after the drawing of the coffee is finished.

SUMMARY OF THE INVENTION

It is the object of the present invention to propose such a safety device which functions reliably and which can be manufactured in a straightforward manner.

According to the present invention, the above object is achieved by providing a chamber in the water conduit of the discharge section of the espresso machine, in which chamber there is a locking member which, in the presence of a predetermined pressure in the chamber, locks the filter holder on the housing of the espresso machine or releases the filter holder as soon as the pressure in the chamber has fallen below a predetermined value.

BRIEF DESCRIPTION OF THE DRAWINGS

These and other features and advantages of the invention will be further understood from the following detailed description of the preferred embodiment with reference to the accompanying drawings in which.

DETAILED DESCRIPTION OF THE PREFERRED EMBODIMENT

Figure 1:
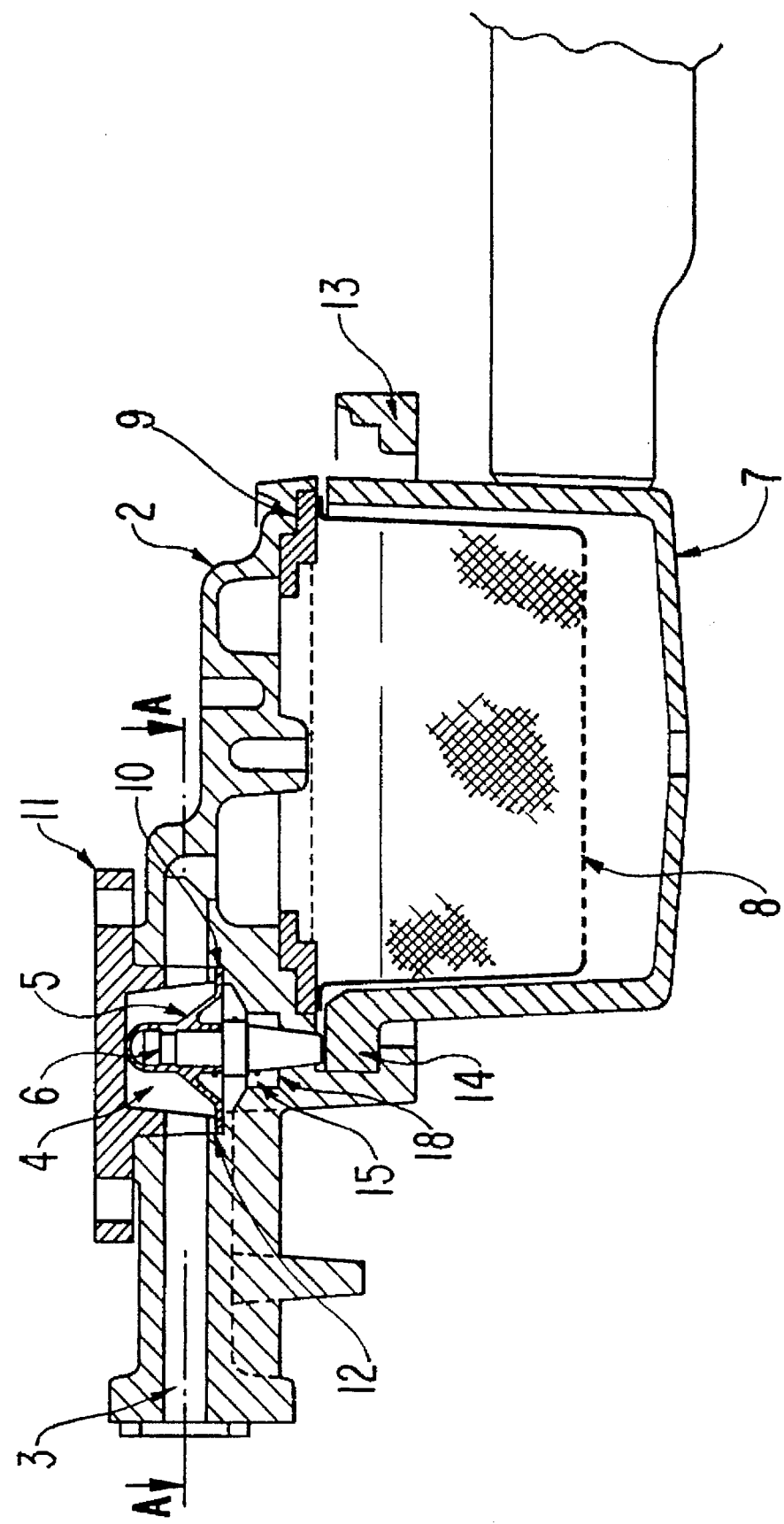
FIG. 1 illustrates a section through the essential structural components of a safety device according to the invention in the released position.
Figure 2:
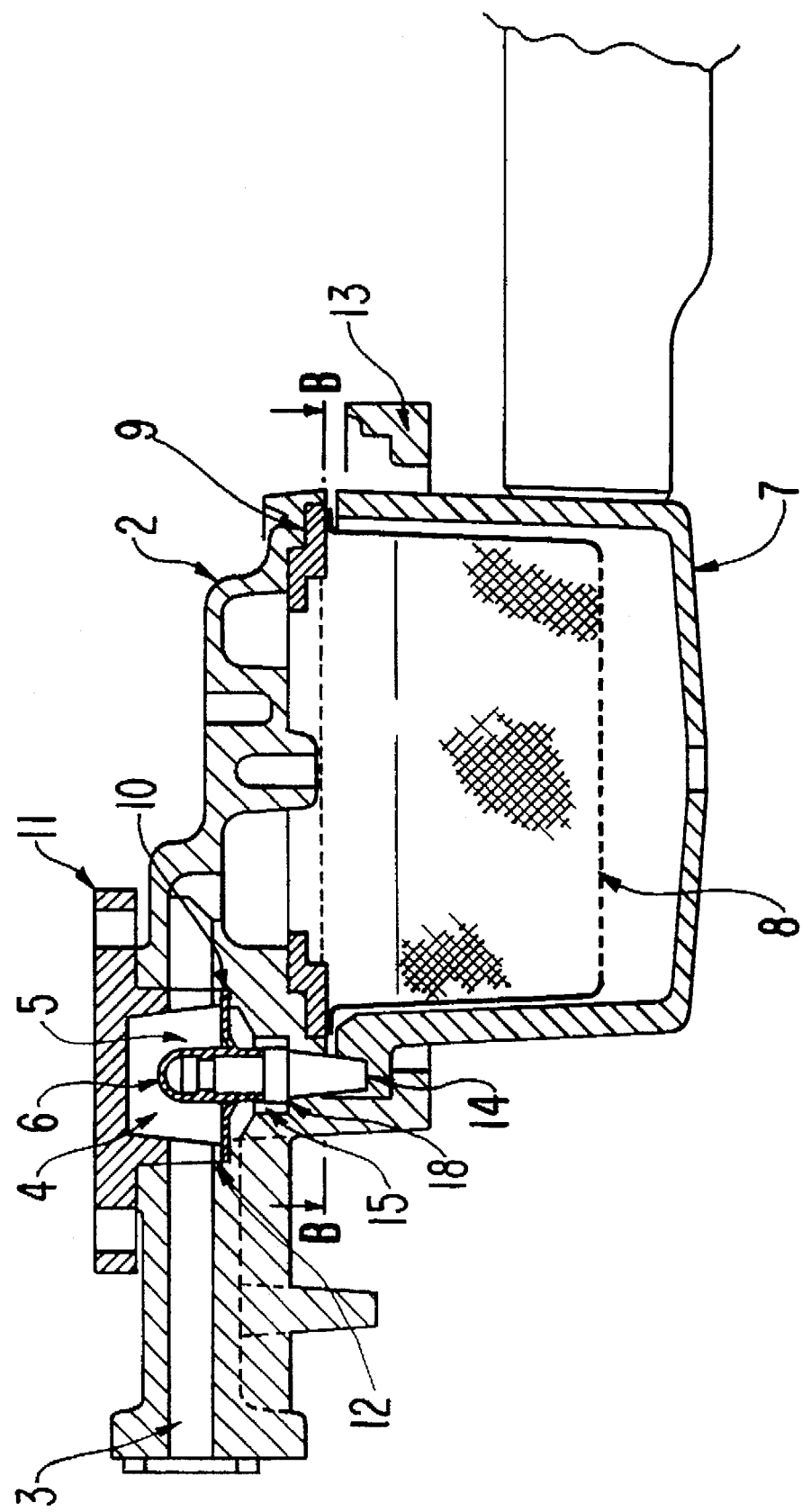
FIG. 2 illustrates the section according to FIG. 1 in the locked position.
Figure 3:
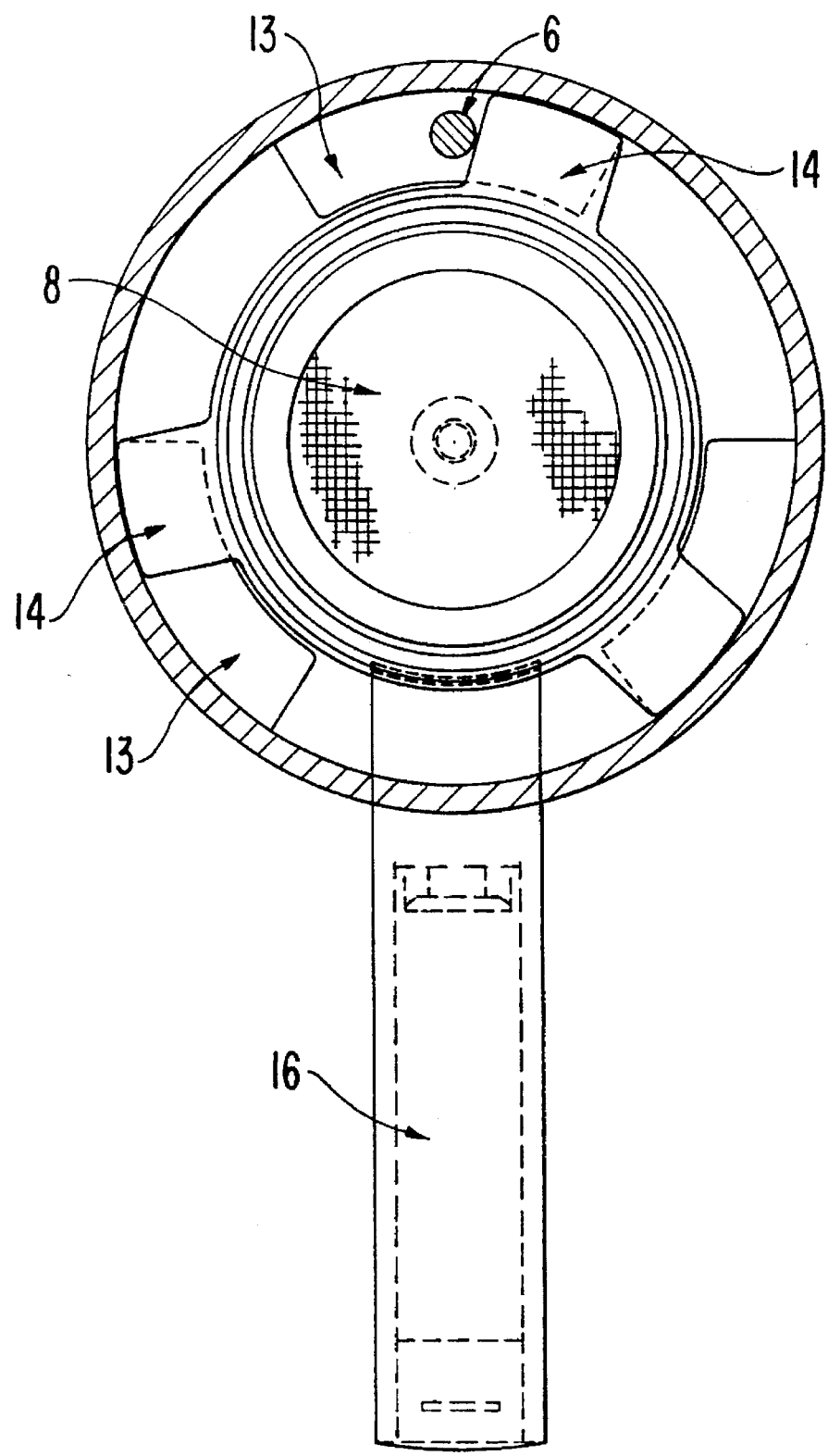
FIG. 3 illustrates the section along the line A-B in FIG. 2 but in greater detail than in FIG. 2.
Figure 4:
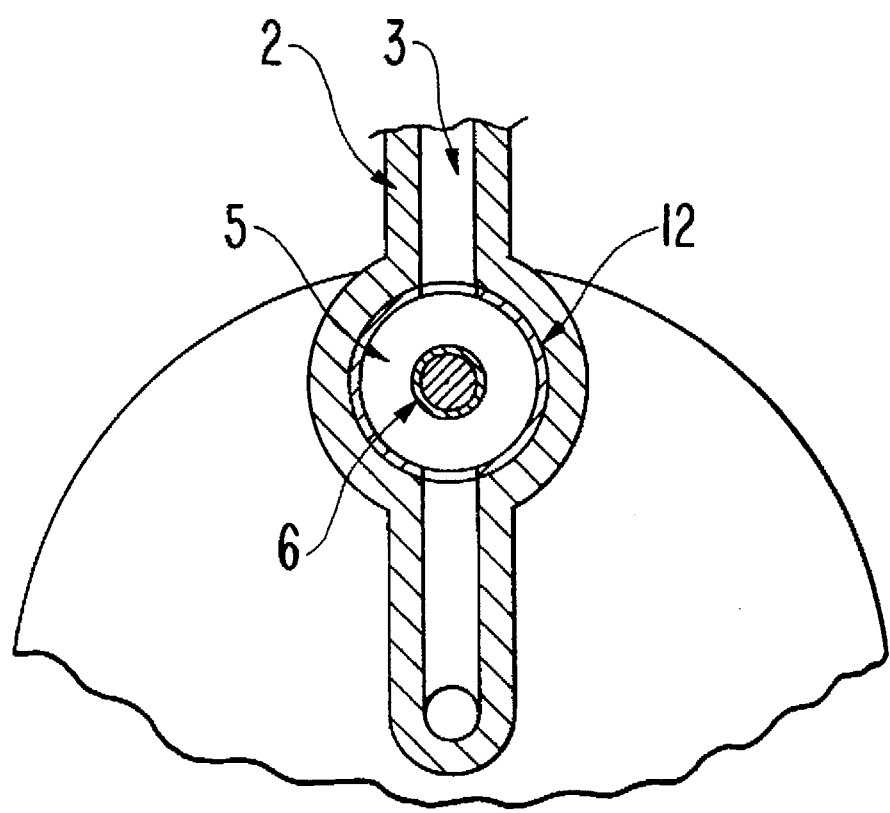
FIG. 4 illustrates the section along the line C-D in FIG. 1.

FIGS. 1 and 2 show an espresso machine 1 having a discharge section 2 with a water conduit 3 within which there is a chamber 4 which is sealed with a lid 11 so as to be waterproof and pressure-tight.

As can be seen from FIGS. 1 and 2, a diaphragm 5 is arranged within the chamber 4 over a bottom, not identified, of the chamber 4. The diaphragm is dynamically balanced around a vertical axis, shown in dashed lines, and comprises a lower outer, approximately frustoconically-shaped segment which extends to the one interior wall of the chamber 4 and a central inner segment shaped approximately as a hollow cylinder. A circumferential annular projection stands out on the inside of the cylinder. The diaphragm 5 is pressed against the bottom of the chamber 4 by means of a collar 12 of a lid 11, with a sealing ring 10 being disposed inbetween; in this manner, the discharge section 2 is sealed so as to be pressure-tight and waterproof.

In its central section, the underside of the diaphragm 5 is fixedly connected with a pin 6 which displaceably extends into the chamber, with the annular projection in the diaphragm 5 being disposed in a groove of the pin 6.

The diaphragm 5 and the pin 6 are held in their resting position, shown in FIG. 1, by means of a pressure spring 15 disposed between a support 18 of the discharge section 2 and a collar 17 on the pin 6.

After a filter holder 7 has been connected by way of a turning motion to the discharge section 2 of the espresso machine by means of a bayonet coupling 13, 14, the pin 6 is pressed downward by the diaphragm 5 into the locking plane of the bayonet catch as soon as pressure builds up in the espresso machine during operation. In this way, the pin 6 blocks the opening path of a leaf 14 of the bayonet coupling of the filter holder 7. This makes it impossible to separate the filter holder 7.

As soon as the pressure in the espresso machine is reduced, the diaphragm 5 moves upward again because of the force of the restoring spring 15. The pin 6 releases the locking leaf 14 of the bayonet coupling and the filter holder can be separated from the espresso machine by way of a pivot motion.

In place of the diaphragm 5 with the pin 6, which act like a piston, a piston of a different configuration or a different element with the same effect may be provided while all other functions remain the same.

It will be understood that the above description of the present invention is susceptible to various modifications, changes and adaptations, and the same are intended to be comprehended within the meaning and range of equivalents of the appended claims.

What is claimed is:

1. An espresso machine utilizing steam pressure and having a filter holder for holding a filter strainer which, with the assistance of a handle, can be detachably locked on a housing of the espresso machine via a bayonet coupling or the like, said espresso machine comprising a discharge section having a water conduit, there being a chamber in said water conduit, and a locking member arranged in said chamber, which locking member, in the presence of a predetermined pressure in the chamber, locks the filter holder on the housing of the espresso machine and releases the filter holder as soon as the pressure in the chamber has fallen below a predetermined value.

2. An espresso machine according to claim 1, wherein said locking member is a diaphragm and a locking pin in operative connection therewith such that, in the presence of a predetermined pressure in the chamber and at the diaphragm, said locking pin locks the filter holder on the housing of the espresso machine by way of the diaphragm against the force of a spring.

3. An espresso machine according to claim 1 further comprising a locking leaf on said filter holder against which said locking pin rests in the locked position.

4. An espresso machine according to claim 1, wherein said locking member is a piston.

* * * * *